(12) United States Patent
Huang et al.

(10) Patent No.: US 11,692,963 B2
(45) Date of Patent: Jul. 4, 2023

(54) MICROFABRICATED ELECTROCHEMICAL GAS SENSOR

(71) Applicants: Yue Huang, East Lansing, MI (US); Stanley Zuo, Danville, IL (US)

(72) Inventors: Yue Huang, East Lansing, MI (US); Stanley Zuo, Danville, IL (US)

( * ) Notice: Subject to any disclaimer, the term of this patent is extended or adjusted under 35 U.S.C. 154(b) by 258 days.

(21) Appl. No.: 17/165,521

(22) Filed: Feb. 2, 2021

(65) Prior Publication Data

US 2022/0244215 A1 Aug. 4, 2022

(51) Int. Cl.
| | |
|---|---|
| *G01N 27/413* | (2006.01) |
| *G01N 27/404* | (2006.01) |
| *G01N 27/414* | (2006.01) |
| *G01N 27/416* | (2006.01) |

(52) U.S. Cl.
CPC ....... *G01N 27/4141* (2013.01); *G01N 27/413* (2013.01); *G01N 27/4162* (2013.01)

(58) Field of Classification Search
CPC ............ G01N 27/413; G01N 27/4162; G01N 27/4141; G01N 27/404; G01N 27/416; G01N 27/31
See application file for complete search history.

(56) References Cited

U.S. PATENT DOCUMENTS 11,346,804 B2 * 5/2022 Huang ................. G01N 27/413

FOREIGN PATENT DOCUMENTS

| DE | 202020106890 U1 * | 3/2021 | .......... G01N 27/413 |
| JP | 2019095329 A * | 6/2019 | |

OTHER PUBLICATIONS

Hithesh K Gatty et al.; A wafer-level liquid cavity integrated amperometric gas sensor with ppb-level nitric oxide gas sensitivity; Journal of Micromechanics and Microengineering; 25; 105013; accessed on Dec. 7, 2022; published Sep. 2015. (Year: 2015).*

* cited by examiner

*Primary Examiner* — Daniel J Colilla

(57) ABSTRACT

A microfabricated electrochemical gas sensor is disclosed. The sensor includes electrodes produced from conductor layers, a capping layer, microcavities through the conductor layers and the capping layer, a cavity connecting the microcavities, and an electrolyte filling in the space created by the cavity and the microcavities in the substrate. The microcavities allow gases to pass through but retain the electrolyte through surface tension.

12 Claims, 6 Drawing Sheets

MICROFABRICATED ELECTROCHEMICAL GAS SENSOR

STATEMENT OF GOVERNMENT SUPPORT

This invention was made with Government support under Grant No. 1913640, awarded by the National Science Foundation. The Government has certain rights in this invention.

RELATED APPLICATIONS

This application is a continuation-in-part of U.S. patent application Ser. No. 16/794,226, filed Feb. 19, 2020, which claims priority to U.S.

FIELD OF THE INVENTION

The invention relates to electrochemical gas sensors.

BACKGROUND OF THE INVENTION

Electrochemical gas sensors measure the concentration of a target gas by recording the oxidizing or reducing Faradic current of the gas molecules at an electrode surface. Conventional electrochemical gas sensors are normally constructed by soaking a stack of working electrodes, a reference electrode, and a counter electrode in a liquid electrolyte and sealing them in a container with a cavity. A gas-permeable membrane next to the cavity allows gas to pass through and retains the electrolyte within the container. Electrochemical gas sensors outperform other types of sensors, such as microfabricated metal oxide sensors, in their sensitivity, selectivity, response time, and power consumption but are significantly larger in size. Although electrodes can be miniaturized through microfabrication, incorporating electrolytes and membranes into the microfabrication process is challenging. Low production rates and the use of a significant amount of noble metals keep the cost high. These disadvantages limit the application of electrochemical sensors in smartphones and wearable devices.

SUMMARY OF THE INVENTION

To address the challenges in the aforementioned art, the present disclosure involves microfabricated electrochemical gas sensor structure without utilizing a gas permeable membrane. In accordance with an embodiment of the present disclosure, the sensor structure consists of microcavities which penetrate through a stack of microfabricated electrodes, a cavity connecting the microcavities, and a liquid electrolyte in contact with the electrodes. The microcavities allow gases to pass through and, at the same time, prevent leakage of the electrolyte through surface tension.

DETAILED DESCRIPTION OF THE INVENTION

Figure 1A:
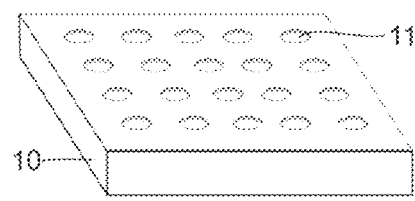
FIG. 1A is a 3D view of a first exemplary embodiment of the present invention, a microfabricated electrochemical gas sensor.
Figure 1B:
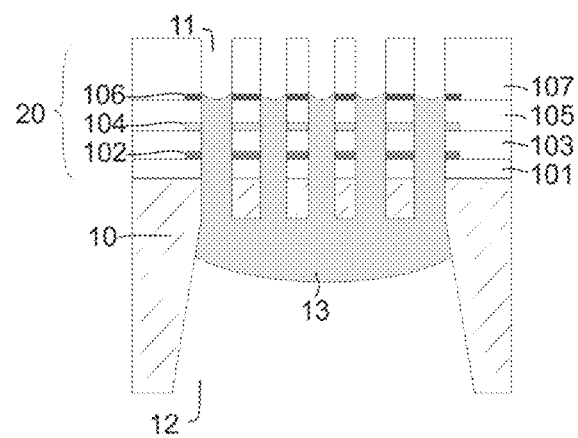
FIG. 1B is a cross-section view of the first exemplary embodiment.
Figure 1C:
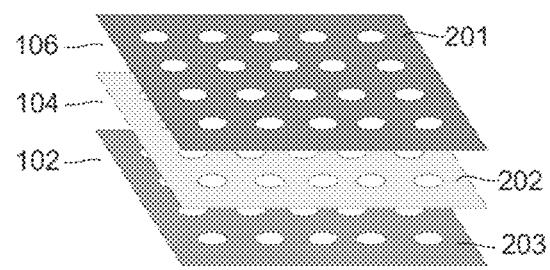
FIG. 1C is a 3D view of the conductor layers of the first exemplary embodiment.

A first exemplary embodiment of the microfabricated electrochemical gas sensor is depicted in FIG. 1A, which shows a substrate 10 and a plurality of microcavities 11 is embedded in the substrate 10. The sensor is about a few square millimeters in size overall, and a microcavity is about a few microns in diameter (figures are not drawn to scale). A cross-section view of the first exemplary embodiment is illustrated in FIG. 1B. A layer stack 20 consisting of conductor layers and dielectric layers is on top of the surface of the substrate 10. Each layer is about a few hundred nanometers to a few microns in thickness. The microcavities 11, preferably cylindrical, penetrate through the layer stack 20 from the top surface of the stack down into the substrate 10. A larger cavity 12 connects the microcavities 11 in the substrate 10 from the bottom surface of substrate 10. A liquid electrolyte 13 is housed by the microcavities 11 and the cavity 12. The liquid electrolyte 13 has a low contact angle (less than 90 degrees) with the conductor surface in the microcavities. The layer stack 20 consists of four dielectric layers and three enclosed conductor layers. From the bottom to the top, these layers are: a bottom dielectric layer 101, a bottom conductor layer 102, a lower intermediate dielectric layer 103, a middle conductor layer 104, an upper intermediate dielectric layer 105, a top conductor layer 106, and a capping layer 107. As shown in FIG. 1C, a working electrode 201, a reference electrode 202, and a counter electrode 203 are produced from the top conductor layer 106, the middle conductor layer 104, and the bottom conductor layer 102, respectively. The area of an electrode is defined by the total area of the electrode exposed in the intersecting microcavity. The electrolyte 13 fills in the microcavities from the bottom cavity 12, bringing all electrodes in the microcavities in contact. However, the electrolyte 13, exhibits, high contact angle (greater than 90 degrees) with the surface of the capping layer 107. It is repelled by the capping layer 107 if in contact, and thus is prevented from leaking out of the microcavities. Electric leads and interconnects to the electrodes are intentionally omitted from the figures for simplicity. The first exemplary embodiment is the preferred embodiment.

Figure 2A:
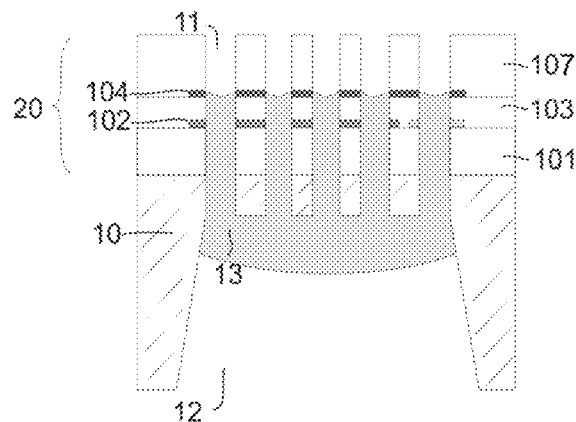
FIG. 2A is a cross-section view of a second exemplary embodiment of the present invention.
Figure 2B:
FIG. 2B is a 3D view of an exemplary arrangement of three electrodes in the two conductor layers of the second exemplary embodiment.
Figure 2C:
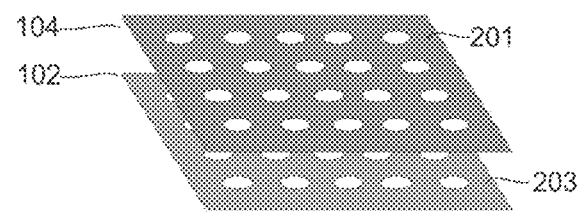
FIG. 2C is a 3D view of an exemplary electrode arrangement of a two-electrode electrochemical sensor of the second exemplary embodiment.

A second exemplary embodiment of the microfabricated electrochemical gas sensor consists of two conductor layers and three dielectric layers. A cross-section view of the second exemplary embodiment is depicted in FIG. 2A. From the bottom to the top, the layers are: a bottom dielectric layer 101, a bottom conductor layer 102, a middle dielectric layer 103, a top conductor layer 104, and a capping layer 105. A working electrode 201 is produced from the top conductor 104, as shown in FIG. 2B. Unlike those of the preferred embodiment, the counter electrode 203 and the reference electrode 202 of the second exemplary embodiment share the bottom conductor layer 102. In the case of implementing a two-electrode electrochemical sensor that uses only two electrodes, the bottom conductor is dedicated to the counter electrode, as shown in FIG. 2C.

Figure 3A:
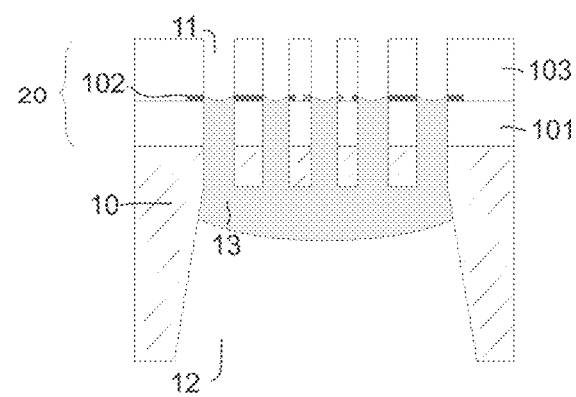
FIG. 3A is a cross-section view of a third exemplary embodiment of the present invention.
Figure 3B:
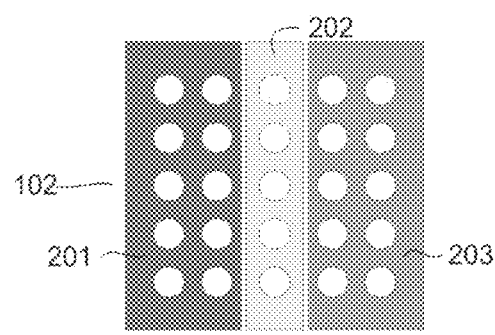
FIG. 3B is an exemplary arrangement of three electrodes in one conductor layer of the third exemplary embodiment.

A third exemplary embodiment of the microfabricated electrochemical gas sensor consists of only one conductor layer that is sandwiched between two dielectric layers. A cross-section view of the third exemplary embodiment is depicted in FIG. 3A. From the bottom to the top, the layers are: a bottom dielectric layer 101, a conductor layer 102, and a capping layer 103. A working electrode 201, a reference electrode 202, and a counter electrode 203 are produced from the same conductor layer 102, as shown in FIG. 3B.

Figure 4A:
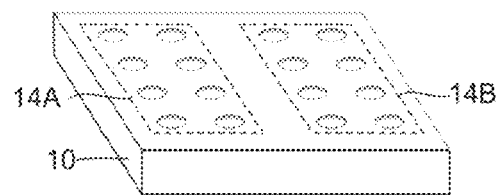
FIG. 4A is a 3D view of a fourth exemplary embodiment of the present invention.
Figure 4B:
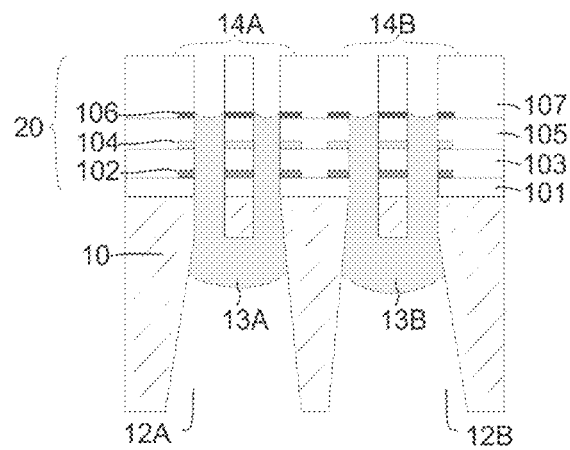
FIG. 4B is a cross-section view of the fourth exemplary embodiment.
Figure 4C:
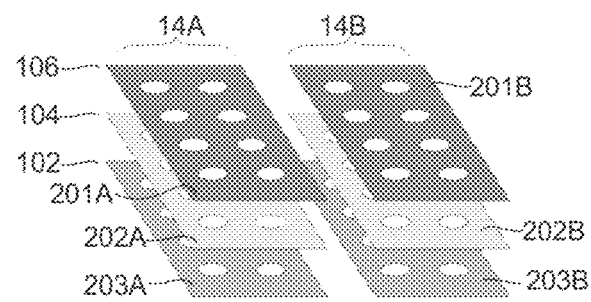
FIG. 4C is a 3D view of the conductor layers of the fourth exemplary embodiment.

A fourth exemplary embodiment of the microfabricated electrochemical gas sensor consists of multiple sensing units. FIG. 4A shows an exemplary embodiment consisting of two sensing units: 14A and 14B. A cross-section view of the fourth exemplary embodiment is depicted in FIG. 4B. The layer stack 20 is the same as that in the preferred embodiment. The difference is that one sensing unit does not share its electrodes, bottom cavity, and electrolyte with another unit. As shown in FIG. 4B, sensing unit 14A connects to a cavity filled with an electrolyte 13A and is isolated from the other sensing unit 14B, which is filled with an electrolyte 13B. As shown in FIG. 4C, each conductor layer is separated from one another to allow each sensing unit to have its own set of electrode: 201A, 202A, and 203A for sensing unit 14A, and 201B, 202B, and 203B for sensing unit 14B.

Figure 5:
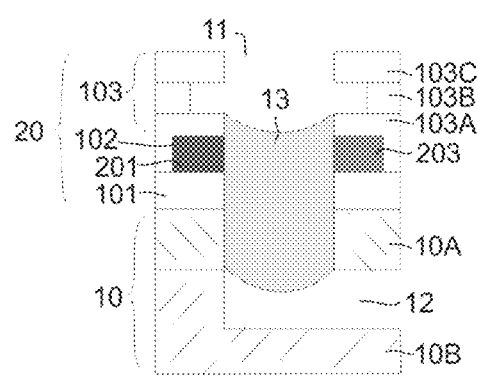
FIG. 5 is a cross-section view of a fifth exemplary embodiment.

A fifth exemplary embodiment of the microfabricated electrochemical gas sensor is shown in FIG. 5. A sensor can consist of a single microcavity 11. A single conductor layer 102 can produce multiple electrodes in the same microcavity, such as a working electrode 201 and a counter electrode 203. A substrate 10 can be a combination of multiple sublayers, such as 10A and 10B, bonded together. These can be made of different materials or structurally different. A capping layer 103 can consist of multiple sublayers, such as 103A, 103B, and 103C, bonded together. These can also be made of different materials or structurally different. The recess of dielectric sublayer 103B creates a discontinuation of the microcavity 11 surface, producing a large surface tension at the edge of the sublayer 103A although the contact angle on the surface of the sublayer 103A is less than 90 degrees. The contact angle of the electrolyte 13 on the substrate sublayer 10A is less than 90 degrees, but is more than 90 degrees on sublayer 10B, keeping the electrolyte 13 from escaping from the cavity 12, along with the surface tension created from the open air edge of the sublayer 10A. Surface tension may not need to be high for certain sublayer of the capping layer 103 or the substrate 10, but is high enough for the entire capping layer 103 or the substrate 10 to prevent the electrolyte 13 from escaping from the microcavity 11 or the cavity 12.

Referring to the substrate materials, a flat and smooth substrate surface is required by photolithography in order to accurately produce the electrodes and the microcavities. The substrate material can be a conductor, a semiconductor, an insulator, or a composite of different materials. A substrate either is a dielectric in nature, or can be processed with a dielectric coating, so that the electrodes produced with the bottom conductor layer are not short-circuited. For example, oxidized silicon wafer, polyimide sheets, quartz plates, and complementary metal oxide semiconductor (CMOS) integrated circuits (IC) are commonly used substrates. The substrate can also be an assembly of two or more substrate materials, which can be raw or processed. For example, a polyimide sheet is fabricated with electrodes, and then is aligned and bonded onto a rigid printed circuit board with pre-drilled holes acting as the backside cavities.

Referring to the conductor layers and the electrode materials that compose the microfabricated electrochemical gas sensor, an electrode layer is fabricated with conductor materials with their necessary electrochemical functions. The conductor layers 102, 104, and 106 comprise conductor or semiconductor materials including, but not limited to, metals, such as gold (Au), silver (Ag), platinum (Pt), palladium, rhodium, and nickel, metal oxides or ceramics, such as aluminum oxide, indium tin oxide (ITO), and titanium nitride (TiN), conductive polymers, such as polypyrrole and polyaniline, and carbon of certain forms, such as boron doped diamond, grapheme, and carbon nanotubes (CNTs). A conductor layer may require a sublayer of adhesion material, such as 5 nm of titanium. The surface of a conductor layer can be partially modified with a different material, for example, carbon nanotubes modified with platinum nanoparticles. A conductor layer or a portion of it can be transformed into a compound. For example, Ag can be partially transformed into AgCl to form Ag/AgCl. The reference electrode material is selected to be compatible with the electrolyte and stable over time.

Referring to the dielectric layer materials that compose the microfabricated electrochemical gas sensor, the dielectric layers 101, 103, and 105 provide electrical insulation and spacing between electrodes and assist in retaining the electrolyte. Dielectric materials, such as silicon oxide, silicon nitride, polyimide, polytetrafluoroethylene (PTFE), or enzocyclobutene (BCB) are commonly used. A dielectric layer may consist of multiple sublayers, for example, a stack of silicon oxide, silicon nitride, and silicon oxide layers. A dummy conductor sublayer can be sandwiched between two dielectric sublayers. The surface of a capping layer can be modified hydrophobic to have a large contact angle with the electrolyte.

An exemplary $SO_2$ sensor, for instance, can be produced with a gold working electrode layer, a silver/silver chloride (Ag/AgCl) pseudo reference electrode layer, and a platinum (Pt) counter electrode layer on top of an oxidized silicon wafer. The Ag/AgCl interface can be made by chlorinating the Ag electrode. Cylindrical microcavities of tens of nanometers to tens of micrometers in diameter penetrate through the electrodes into the substrate. A backside about the size of the overall electrode area penetrates the substrate and connects to the microcavities. The microcavities are filled with electrolyte, for example, 1-butyl-3-methylimidazolium bis (trifluoromethylsulfonyl)imide (BMIM NTF2) ionic liquid. To detect sulfur dioxide ($SO_2$), the sensor is operated at a bias potential of 1.4 V (vs Ag/AgCl). With a reduction bias potential, the same $SO_2$ sensor can be converted into a hydrogen sulfide ($H_2S$) sensor. The sensor can be modified to detect other gases such as: carbon monoxide, carbon dioxide, alcohol vapor, propane, formaldehyde, benzene, methane, hydrogen cyanide, nitric oxide, nitrogen dioxide, oxygen, and ozone.

Figure 6:
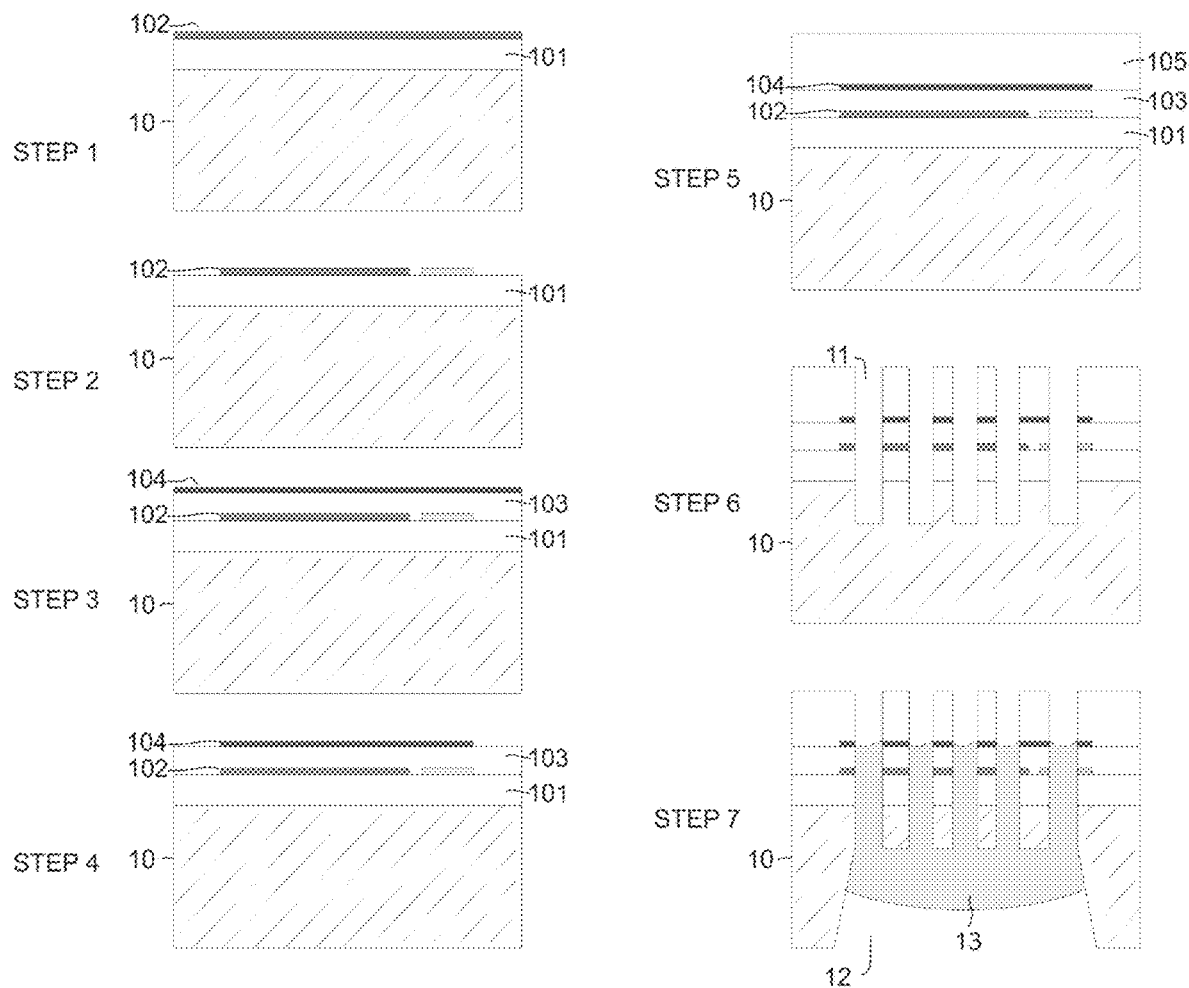
FIG. 6 is an exemplary microfabrication process flow for making the second exemplary embodiment.

Referring to the fabrication process for producing the present invention, an exemplary microfabrication process flow for the second embodiment is illustrated in FIG. 6. The process starts with a deposition of the bottom conductor 102 on the substrate 10 coated with dielectric layer 101 in STEP 1. The substrate—made of, for example, an oxidized silicon wafer—is the carrier of the sensor. Other substrate materials include, but are not limited to, quartz, sapphire, ceramic, polymer, and complementary metal-oxide semiconductor (CMOS) wafers. In STEP 2, the conductor 102 is patterned through photolithography, wet etching, or dry etching to form contacts and isolate different sensor units. Contacts are not shown in the figures. They are conductor pads that are exposed on the device's surface, allowing interconnection of the sensor electrodes and circuitry. This step may include deposition, photolithography, and etching of multiple conductor materials. For the second exemplary embodiment with a Pt counter electrode and a Ag/AgCl reference electrode, for example, the step includes the deposition of Pt, and subsequent photolithography and etching to pattern the counter electrode, followed by the deposition of Ag and subsequent photolithography and etching processes to pattern the reference electrode. This ensures that the counter electrode and the reference electrode are in the same conductor layer. The patterned conductor layer 102 is then passivated with the dielectric layer 103 in STEP 3. The conductor layer 104 is deposited onto the dielectric layer 103. In STEP 4, the conductor layer 104 is patterned. In STEP 5, the top conductor layer 104 is passivated with dielectric layer 105. STEP 6 patterns the cavities and then etches through the layers 105, 104, 103, 102, and 101 into the substrate 10. STEP 7 opens backside cavity 12 and fills the microcavities with the right amount of electrolyte. Ag can be partially converted to AgCl to form a Ag/AgCl reference electrode after STEP 7.

In broad embodiment, the present invention is a microfabricated membraneless electrochemical gas sensor. The sensor consists of a layer stack on the top surface of a substrate. The layer stack consists of two or more thin-film electrodes produced from one or more conductor layers, and a capping layer over the top conductor layer. The sensor also consists of one or more microcavities that penetrate the layer stack, and a cavity from the bottom surface of the substrate connecting to the microcavities in the substrate. An electrolyte is housed in the internal space created by the microcavities and the cavity, allowing electrolytic communication among all electrodes exposed in the microcavity or the cavity. The electrolyte is kept within the microcavities by its surface tension with the capping layer. Multiple sensor units can be produced in the same substrate. The electrode material, the electrolyte, and the bias potential can be the same or different from one sensor unit to another.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. An electrochemical gas sensor comprising:
    a substrate comprising a top surface and a bottom surface; and
    a layer stack on the top surface of the substrate, wherein a plurality of electrodes resides in one or more conductor layers, wherein a dielectric layer insulates the substrate, wherein a dielectric layer insulates two adjacent conductor layers, and wherein there is a capping layer; and
    one or more microcavities penetrating through the layer stack from the capping layer down into the substrate; and
    a cavity penetrating through the substrate from the bottom surface of the substrate, wherein the cavity connects to the one or more microcavities in the substrate; and
    an electrolyte housed by the cavity and the one or more microcavities, wherein the electrolyte connects the electrodes, and wherein the electrolyte is held by its surface tension on the capping layer surface in the one or more microcavities.

2. The sensor of claim 1, wherein the substrate comprises a material selected from the group consisting of: silicon, glass, quartz, polymer, ceramic, sapphire, metal, and complementary metal-oxide semiconductor.

3. The sensor of claim 1, wherein the stack comprises a dielectric layer of a material selected from the group consisting of: silicon dioxide, silicon nitride, amorphous silicon, polyimide, and parylene.

4. The sensor of claim 1, wherein the stack comprises a conductor layer of a material selected from the group consisting of: metal, metal oxide, ceramic, conductive polymer, carbon, palladium, rhodium, nickel, titanium nitride, indium tin oxide, conductive polymer, boron doped diamond, graphene, and carbon nanotube.

5. The sensor of claim 1, wherein a working electrode and a counter electrode are in a first conductor layer.

6. The sensor of claim 5, wherein a reference electrode is in the first conductor layer.

7. The sensor of claim 1, wherein a working electrode is in a first conductor layer and a counter electrode is in a second conductor layer.

8. The sensor of claim 7, wherein a reference electrode is in the first conductor layer.

9. The sensor of claim 7, wherein a reference electrode is in a second conductor layer.

10. The sensor of claim 7, wherein a reference electrode is in a third conductor layer.

11. The sensor of claim 1, wherein a contact angle of the electrolyte on the electrode surface in a microcavity is less than 90 degrees.

12. The sensor of claim 1, wherein a contact angle of the electrolyte on the capping layer surface in a microcavity is greater than 90 degrees.

* * * * *